(12) United States Patent
Vestergaard

(10) Patent No.: US 7,530,452 B2
(45) Date of Patent: May 12, 2009

(54) CONVEYOR GUARD

(76) Inventor: Martin Vestergaard, Søhøjen 15, Svogerslev, DK-4000 Roskilde (DK)

( * ) Notice: Subject to any disclaimer, the term of this patent is extended or adjusted under 35 U.S.C. 154(b) by 0 days.

(21) Appl. No.: 11/795,061

(22) PCT Filed: Jan. 11, 2006

(86) PCT No.: PCT/DK2006/000017
§ 371 (c)(1),
(2), (4) Date: Sep. 24, 2007

(87) PCT Pub. No.: WO2006/074659
PCT Pub. Date: Jul. 20, 2006

(65) Prior Publication Data
US 2008/0110731 A1 May 15, 2008

(30) Foreign Application Priority Data
Jan. 11, 2005 (DK) .......................... PA 2005 00044

(51) Int. Cl.
B65G 15/02 (2006.01)

(52) U.S. Cl. .................. 198/831; 198/861.2; 198/861.1; 193/35 F

(58) Field of Classification Search ................. 198/831, 198/861.2, 861.1, 812, 313; 193/35 F
See application file for complete search history.

(56) References Cited

U.S. PATENT DOCUMENTS

| 1,487,634 | A | | 3/1924 | Waters |
| 2,307,389 | A | | 1/1943 | Carter |
| 2,346,659 | A | | 4/1944 | Bruce |
| 2,494,302 | A | * | 1/1950 | Mason ...................... 193/35 F |
| 3,045,791 | A | * | 7/1962 | Ayres ........................ 193/35 F |
| 3,103,271 | A | | 9/1963 | Christiansen, Jr. |
| 5,301,790 | A | | 4/1994 | Prydtz et al. |
| 6,584,376 | B1 | | 6/2003 | Van Kommer |
| 6,607,066 | B1 | | 8/2003 | Andersen et al. |
| 7,261,202 | B1 | * | 8/2007 | Canapa ........................ 198/812 |
| 2004/0105740 | A1 | | 6/2004 | Thogersen |

FOREIGN PATENT DOCUMENTS

| DE | 2119007 | 11/1972 |
| EP | 0767126 | 4/1997 |
| FR | 1564844 | 4/1969 |
| RU | SU 477905 | 11/1975 |
| WO | WO2005/073110 | 8/2005 |

* cited by examiner

Primary Examiner—James R Bidwell
(74) Attorney, Agent, or Firm—James Creighton Wray

(57) ABSTRACT

A guard for a conveyor used for conveying objects where the objects may have elements which extend outside the object itself, and which thereby may become stuck in the conveyor structure per se is provided between extremities of the free ends of conveying elements to prevent entanglement.

10 Claims, 3 Drawing Sheets

CONVEYOR GUARD

This application claims the benefit of Danish Application No. PA200500044 filed Jan. 11, 2005 and PCT/DK2006/000017 filed Jan. 11, 2006, which are hereby incorporated by reference in their entirety.

FIELD OF THE INVENTION

The present invention relates to a guard for use with a conveyor structure.

BACKGROUND OF THE INVENTION

Conveyors are used in industries for a number of purposes, and the present invention is particularly directed to a conveyor used for conveying objects where the objects may have elements or parts which extend outside the object itself, and which thereby may become stuck or entangled in the conveyor structure per se.

Such objects may be labels, handles, straps, etc. of luggage to be conveyed to and from for example the cargo bay in aircrafts, or be straps, strings or wires of products being conveyed in a manufacturing process.

The objects which have these elements extending from the object itself may be partly or wholly destroyed and further as the elements become stuck or entangled in the conveying structure, it may be necessary to shut down the entire conveying structure in order to liberate the element which has become stuck. In particular for luggage and the like, the luggage labels are very fragile, and may easily become detached from the piece of luggage. This may lead to problems relating to which destination to forward the luggage to, which aircraft it was meant for, who it belongs to, etc.

For industrial products, items are also sometimes labelled, in particular with test results for electronic equipment or quality control certificates, ingredient labelling, or weight/temperature characteristics. If this information is lost, the overall level of recognizability and determinability of the objects or produce used in the production process becomes unstable and unreliable.

From U.S. Pat. No. 2,307,389 a conveyor structure is known, wherein independent rollers are connected by means of plate members. The plate members of adjacent rollers overlap, and are provided with apertures, such that by superposing the apertures of two overlapping plate members and inserting a pin through the apertures, the two adjacent rollers may turn in relation to each other. At the extreme ends of the rollers, flange plates are provided, such that the flange plates on one roller will overlap the flange plates on an adjacent roller. The flange plates have a plane perpendicular to the transport plane created by the rollers. In this manner the flange plates help products/objects transported on the conveyor structure to stay on the rollers during turns.

In the art, a number of further conveying devices are constructed by interconnecting more or less self-propelling conveying elements such as for example disclosed in prior art patent applications US 2004 105740, U.S. Pat. Nos. 5,301,790, 5,584,376, 6,607,066, 2,494,302, FR 1564844, and EP 0767126. Common for all these prior art devices is the fact that they are constructed from interconnected and articulately connected conveying elements such that one conveying element may flex in relation to the adjacent conveying element. Furthermore, common for all these devices is the fact that as they are used in a side-flexing manner, there will be a varying gap between the conveying elements along the inner side of the curve in comparison to the outer side of the curve. It is, thereby, possible that parts of the objects to be conveyed along the conveying structure may become entangled in the conveying elements per se.

Furthermore, as this type of conveying structure is not provided with guiding elements along the extremities, it may have a tendency to twist in the plane such that one conveying element may be seriously out of the conveying plane due to the tensions arising in the system as the conveying structure is made to side-flex. This is partly due to the fact that the conveying elements extend to both sides of a centrally arranged connection system, which connection system may be constructed such that it is highly articulate, i.e. it will be fairly easy to angle one conveying element in relation to the adjacent conveying element. Even on a smooth surface, the tension in the system may create twisting, and thereby a scissor-like configuration of the conveying elements making up the conveying structure.

OBJECT OF THE INVENTION

Consequently, it is an object of the present invention to alleviate the disadvantages mentioned above, and improve the usability and reliability of the prior art devices.

DESCRIPTION OF THE INVENTION

The present invention addresses this by providing a guard for use with a conveyor structure where the conveyor structure comprises a number of articulately jointed conveying elements such that the conveying elements provide a conveying plane for conveying objects, where each conveying element has at least one free end extending away from the articulate joint, and where a guard is provided between the extremities of the free ends of the conveying elements.

As objects are transported on the conveying structure, straps, tags and the like which otherwise would have a tendency to fall down between two adjacent conveying elements will be supported by the guard connected between the extremities of the conveying elements such that they will be kept substantially free from the conveying elements, and will not be able to become entangled for example by encircling the end of the conveying element, become stuck between two conveying elements which are in close proximity, and the like. Furthermore, the guard may be dimensioned such that it will help delimit the side-flexing abilities of the conveying structure, whereby it is assured that two adjacent conveying elements do not come into contact, and furthermore that two adjacent conveying elements do not come substantially out of a common transport plane which could interfere and jeopardise with the proper working of the entire conveyor structure.

In a further advantageous embodiment, the conveying elements are rollers, and the guard is fastened between non-rotating parts of each roller. As mentioned above in relation to the prior art, some of the conveying structures to which the present invention is directed, comprise interconnected conveying elements in the shape of rollers. For these rollers, it is advantageous to attach the guard to a non-rotating part at the very extreme end of the conveying elements such that it is assured that the guard does not interfere with the conveying element as such.

In a further advantageous embodiment, the conveying elements are box elements in which box elements in an upper part conveying means are arranged, and the guard is arranged between outer edges of adjacent boxes. From the prior art mentioned above it is also known that instead of rollers being the conveying elements, boxes may be used, in which boxes conveying means are provided, for example in the shape of endless belts, rollers, wheels or the like. In order to provide the same security against straps, tags, handles and the like becoming stuck between two adjacent boxes, the guard may be arranged at the extremities of the box, whereby the same advantages as mentioned above will be achieved.

Although it is contemplated that the conveying elements may extend to one side only in relation to the articulated joint provided between two adjacent conveying elements, it is also contemplated that the conveying elements may extend on either side of the articulated joint, and that guards are provided on both extremities of each conveying element. In this configuration, a further advantage is provided with the guard according to the present invention. By dimensioning the length of the guard appropriately, it is possible to assure that as the conveying structure flexes to one side or the other, the guards arranged along one extremity of the conveying elements will be fully extended in a situation where the conveying elements along the opposing side are just not touching. In this way, the guard will act as a further security in assuring that the side-flexing capabilities of the conveying structure per se are not over-extended such that adjacent conveying elements will interfere with each other.

In a further advantageous embodiment, the guard is flexible and/or resilient and may be made from rubber, modified rubber, resilient polymer compounds or the like. Hereby, the adjacent conveying elements are free to articulate in relation to each other, only confined by the joint between the two conveying elements, and the length and resiliency of the guard. As two adjacent conveying elements are flexed in relation to each other, the guard on the outside of the turn will be stretched, whereas the guard on the inside of the turn will be completely tension-less, and due to the flexible and/or resilient characteristics of the material from which the guard is made, it will just hang from the fastening points on the extremities of the conveying elements.

In a further advantageous embodiment, the guard is extendable/retractable, for example by a telescopic construction such that it may alter length depending on the distance between the extremities of two adjacent conveying elements. The configuration of the guard being extendable/retractable, such as it may be achieved with a telescopic construction, which for example is made of a hard plastic material or steel, provides added rigidity and stiffness to the conveying structure. By arranging the fastening means of the guard to the extremities of the conveying elements in a proper way, fully articulated joints may be provided such that the flexibility of the conveying structure is not hampered. The more rigid guard members according to this embodiment in comparison to the more flexible and/or resilient guards provided in the embodiment mentioned above, may add further stiffness to the conveyor structure such that the problems relating to one or more conveying elements coming out of the transport plane in a scissor-like movement may be further minimized.

In a still further advantageous embodiment of the invention, the guard is a flexible continuous member, where said guard extends from the extremity of a first side of a first conveying element to which conveying elements' extremity the guard is fixed, and that the guard passes through eye parts arranged on said first side at the extremities of the remaining conveying elements along said first side, and that at the end of the conveyor, opposite to the end where the guard is fastened, the guard by means of pulleys is led to the second side of the conveying elements, on which second side the guard is passed through eye parts arranged at the extremities of the conveying elements to the second side of the first conveying element, where the guard is fixed to the first conveying elements' second side extremity.

In this fashion, the guard member having a fixed length is fastened to the same conveying element. By treading the guard through eye parts on the extremities of the remaining conveying elements, and turning the guard around pulleys at the opposite end of the conveyor, and furthermore guiding the guard through eye parts arranged at the opposite extremities of the conveying elements back to the first element, and fastening the guard to this element, one continuous guard member is provided. As the conveyor flexes to one side, the eye parts will slide along the guard such that the extremities on the inside of the turn will have a lesser spacing, and the eye parts on outside of the turn will have a larger spacing. The pulleys arranged at the end allows for easy manoeuvring, and adaptation of the conveying structure such that the guard is not a hindrance for the flexibility of the conveying structure.

It may, further, be contemplated that pulleys have a frictional engagement with the guard, and that a for example electrically driven step motor is attached to the pulley such that it becomes possible to actively flex the conveyor to one side or the other by operating the pulley, which in turn will translate the guard to one side or the other, and thereby pull in one or the other side of the conveyor belt, and thereby change the turning direction of the conveyor structure.

DESCRIPTION OF THE DRAWING

The invention will now be explained in more detail with reference to particular embodiments of the invention. It should, however, be noted that although the invention is explained with respect to the applicant's prior patent application PCT/DK2004/000065, the guards contemplated within the present application may be applied to a multitude of other devices with corresponding effect, for example one or more of the devices mentioned above relating to the prior art.

DETAILED DESCRIPTION OF THE INVENTION

Figure 1:
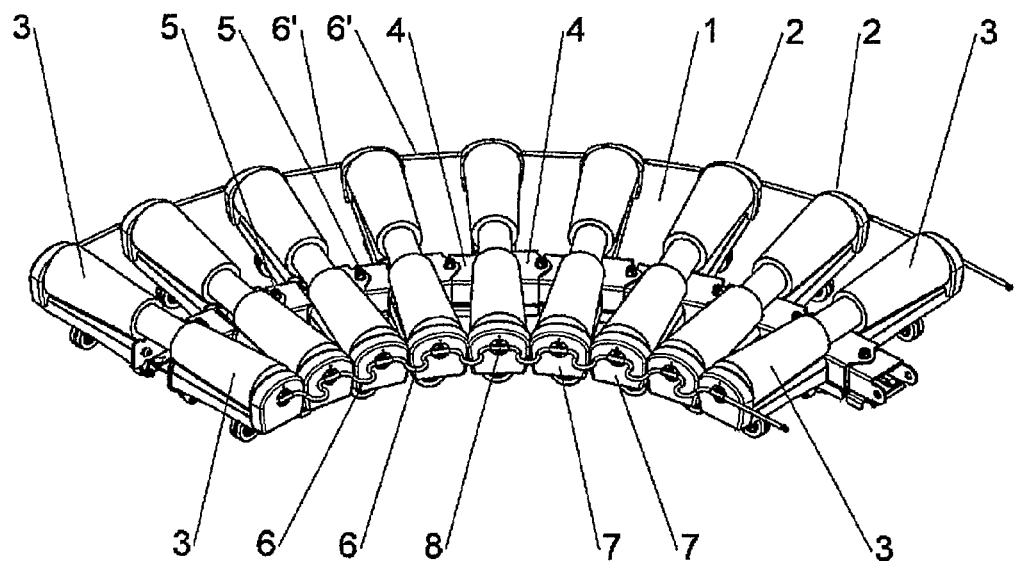
FIG. 1 illustrates a double-sided conveyor structure having guards on both extremities.
Figure 2:
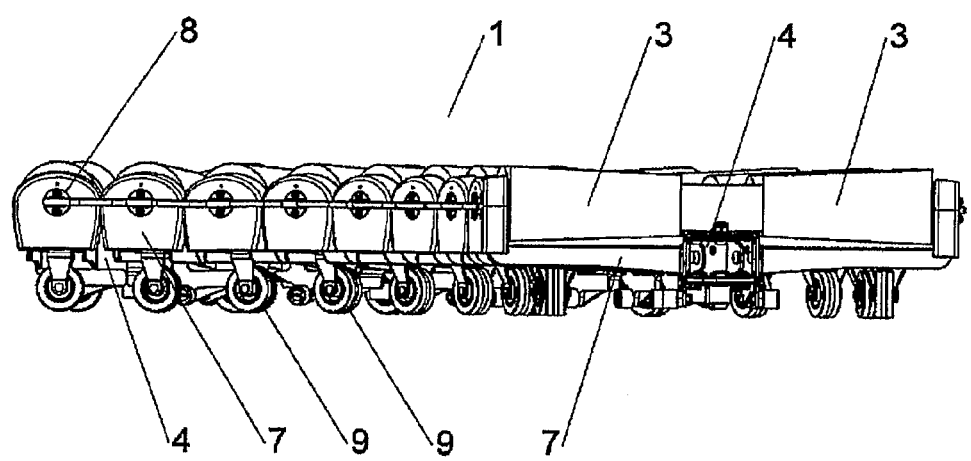
FIG. 2 illustrates a sideways view of the device in FIG. 1, FIGS. 3 and 4 illustrate a second embodiment of the guard configuration.

FIG. 1 illustrates a double-sided conveyor structure having guards on both extremities FIG. 2 illustrates another view of this conveyor structure.

The conveyor structure 1 comprises a number of conveying elements 2 which are interconnected by articulated joints 5 such that one conveying element 2 may flex in relation to an adjacent conveying element 2.

In this embodiment, the conveying elements 2 comprise rollers 3 which are arranged on brackets 7. The advantages of this embodiment are further developed in the above mentioned prior patent application from the same applicant.

The brackets 7 are equipped with wheels 9 such that the entire conveyor structure 1 easily may be manoeuvred on a surface. The rollers 3 are attached through central chain box members 4 which articulate via the joints 5 in relation to adjacent chain box elements 4.

The guards 6 are provided along both extremities of the conveyor structure 1.

In FIG. 1, the conveying structure is illustrated as going through a turn. On the inner side of the conveying structure 1, the guards 6 are bent, i.e. they are slacked due to the lesser distance between the extremities of two adjacent rollers 3. On the outer extremity of the rollers 3, the guards 6' are extended in order to span the distance between the extremities of two adjacent rollers.

As indicated, the guards 6 are fastened to the brackets 7 at the points 8.

Figure 3:
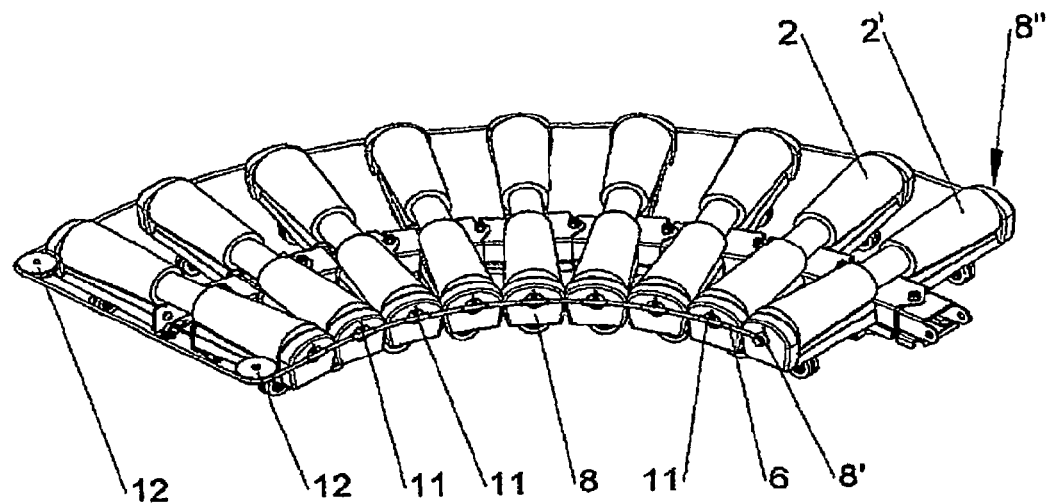

In FIG. 3, it is essential that the guards 6 are not fastened at the extremities 8 of the conveying elements. The guards 6 are only fastened on a first conveying element 2' in the extremities 8', 8". At the extremity 8 of the other conveying elements 2, eye parts 11 are provided through which the guard 6 may be treaded and freely moved back and fourth. In this manner, the guard does not interfere with the flexibility of the conveying element 2 in relation to an adjacent conveying element. The guard 6 is at one end fastened in the extremity 8', and the other end of the guard, which is a continuous member, is fastened at the opposite side of the same conveying element 2' in the second extremity 8". At the opposite end of the conveyor, the guard 6 is by means of pulleys 12 led to the second side of the conveyor, where a comparable arrangement as described above with respect to the first side is provided.

Figure 4:
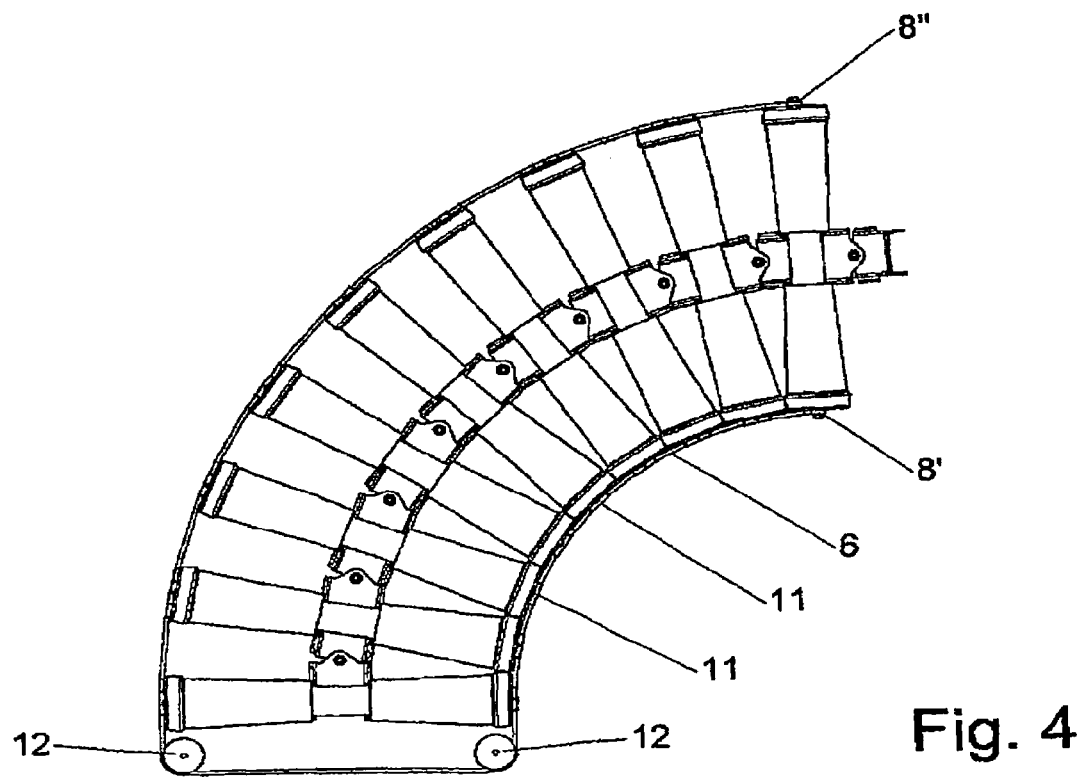

In FIG. 4, the arrangement may be seen from above. As a conveying element for the entire conveying structure is being pushed and pulled, for example inside the cargo area of an aircraft, the conveying structure will conform in shape to the desired path along which it is desirable to transport for example luggage. The conveying structure will be able to flex freely in that the pulleys 12 allow for easy translation of the guard 6 back and fourth such that the conveying elements 2 may flex freely in relation to each other as if no guard was present. On the other hand, by providing the guard in the shape of one continuous substantial taut member, the guard will further alleviate any tendencies of neighbouring conveying elements 2 to come out of the transport plane, for example by scissoring as mentioned above.

Figure 5:
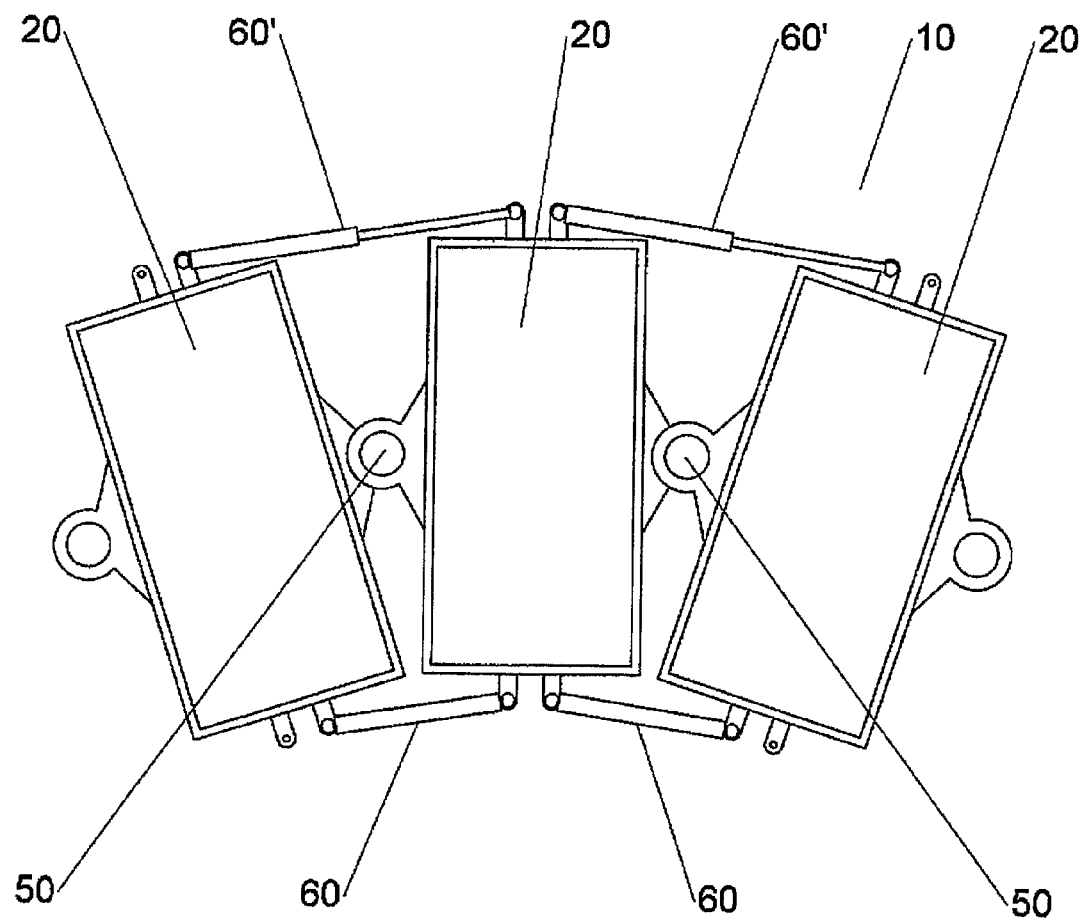
FIG. 5 illustrates a third embodiment of a guard arrangement.

In FIG. 5, a further embodiment is illustrated, where the conveying structure 10 comprises a number of conveying elements 20, where each conveying element 20 is a box structure. The actual conveying means are not illustrated. Two adjacent conveying elements 20 are connected by an articulate joint 50. At the extremities of the conveyor elements 20, guards 60, 60' are arranged. The guards 60, 60' are in the shape of extendable/retractable telescopic members such that, as illustrated on the inner side of the box elements 20, the telescopic members 60 are substantially completely retracted, whereas on the outside of the box elements 20, the telescopic guard elements 60' are fully extended.

As mentioned above, the invention although explained in detail with reference to two particular embodiments may not be limited to being applied to conveyor structures as mentioned in the detailed description, but shall only be limited within the scope of the appended claims.

The skilled person would be able to select appropriate materials in order to provide the flexibility of the guard members depending on the circumstances, but also with due care to flexibility, durability and life-expectancy of the guards.

In this connection, it should be mentioned that the fastening means 8 of the guards to the brackets or to the non-rotating parts of the roller elements 3 may be a snap-on connection such that the guard 6 easily may be replaced in case of failure. Furthermore, the guard 6 may extend between two or more roller extremities, such that for example one long guard member may extend along the extremity of the entire conveying structure 1.

The invention claimed is:

1. Guard for use with a conveyor structure where the conveyor structure comprises a number of articulately jointed conveying elements such that the conveying elements provide a conveying plane for conveying objects, where each conveying element has at least one free end extending away from the articulate joint, and where a guard is provided between the extremities of the free ends of the conveying elements and below the conveying plane.

2. Guard according to claim 1, wherein the conveying elements are rollers, and that the guard is fastened between non-rotating parts of each roller.

3. Guard according to claim 1, wherein the conveying elements are box elements in which box elements in an upper part conveying means are arranged, and that the guard is arranged between outer edges of adjacent boxes.

4. Guard according to claim 1, wherein the conveying elements may extend on either side of the articulated joint, and that guards are provided on both extremities of each conveying element.

5. Guard according to claim 1, wherein the guard is flexible and/or resilient, and may be made from rubber, modified rubber, or resilient polymer compounds.

6. Guard according to claim 1, wherein the guard is extendable/retractable, for example by a telescopic construction such that it may alter length depending on the distance between the extremities of two adjacent conveying elements.

7. Guard according to claim 1, wherein the guard may extend between two or more adjacent conveyor elements.

8. Guard according to claim 1, wherein the guard is fastened to the conveying elements by snap-on fastening means.

9. Guard for use with a conveyor structure where the conveyor structure comprises a number of articulately jointed conveying elements such that the conveying elements provide a conveying plane for conveying objects, where each conveying element has at least one free end extending away from the articulate joint, and where a guard is provided between the extremities of the free ends of the conveying elements, wherein the conveying elements may extend on either side of the articulated joint, and that guards are provided on both extremities of each conveying element, wherein the guard is a flexible continuous member, where said guard extends from the extremity of a first side of a first conveying element to which conveying elements' extremity the guard is fixed, and that the guard passes through eye parts arranged on said first side at the extremities of the remaining conveying elements along said first side, and that at the end of the conveyor, opposite to the end where the guard is fastened, the guard by means of pulleys is led to the second side of the conveying elements, on which second side the guard is passed through eye parts arranged at the extremities of the conveying elements to the second side of the first conveying element, where the guard is fixed to the first conveying elements' second side extremity.

10. Guard for use with a conveyor structure where the conveyor structure comprises a number of articulately jointed conveying elements such that the conveying elements provide a conveying plane for conveying objects, where each conveying element has at least one free end extending away from the articulate joint, and where a guard is provided between the extremities of the free ends of the conveying elements wherein the guard is flexible and/or resilient, and may be made from rubber, modified rubber, or resilient polymer compounds.

* * * * *